(12) United States Patent
Suzuki et al.

(10) Patent No.: US 8,002,305 B2
(45) Date of Patent: Aug. 23, 2011

(54) LOW-FLOOR TYPE VEHICLE

(75) Inventors: Kazuhiro Suzuki, Saitama (JP); Yuki Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 12/331,841

(22) Filed: Dec. 10, 2008

(65) Prior Publication Data

US 2009/0167001 A1 Jul. 2, 2009

(30) Foreign Application Priority Data

Dec. 27, 2007 (JP) ................................. 2007-338145

(51) Int. Cl.
*B60R 21/18* (2006.01)
*B60R 21/201* (2011.01)

(52) U.S. Cl. ..................................... 280/728.2; 280/733

(58) Field of Classification Search ............... 280/728.2, 280/730.1, 733
See application file for complete search history.

(56) References Cited

U.S. PATENT DOCUMENTS

| 6,007,090 | A | * | 12/1999 | Hosono et al. | 280/730.2 |
| 6,932,379 | B2 | * | 8/2005 | Yamazaki et al. | 280/730.1 |
| 7,048,299 | B2 | * | 5/2006 | Iijima et al. | 280/730.1 |
| 7,083,187 | B2 | * | 8/2006 | Akiyama et al. | 280/730.1 |
| 7,357,407 | B2 | * | 4/2008 | Kuroe et al. | 280/728.2 |
| 7,434,830 | B2 | * | 10/2008 | Tsunoda et al. | 280/730.1 |
| 7,744,119 | B2 | * | 6/2010 | Iijima | 280/730.1 |
| 7,823,921 | B2 | * | 11/2010 | Kato et al. | 280/743.2 |
| 2005/0167961 | A1 | * | 8/2005 | Murata et al. | 280/755 |
| 2007/0052218 | A1 | * | 3/2007 | Miyata | 280/730.1 |
| 2007/0063491 | A1 | * | 3/2007 | Horiuchi et al. | 280/728.2 |
| 2010/0270777 | A1 | * | 10/2010 | Hanafusa | 280/728.2 |
| 2010/0270778 | A1 | * | 10/2010 | Hanafusa et al. | 280/728.2 |

FOREIGN PATENT DOCUMENTS

JP 2004-338658 A 12/2004
JP 2007-83954 A 4/2007

* cited by examiner

*Primary Examiner* — Paul N Dickson
*Assistant Examiner* — Karen A Beck
(74) *Attorney, Agent, or Firm* — Birch, Stewart, Kolasch & Birch, LLP

(57) ABSTRACT

A low-floor vehicle includes a head pipe turnably supporting a steering handlebar steerable by an occupant; a main frame extending downwardly rearward from the head pipe; an occupant seat provided rearward of the head pipe and adapted to allow the occupant to sit thereon; a straddle space defined between the occupant seat and the steering handlebar and straddlable by the occupant; an airbag module provided forward of the occupant seat and storing an airbag therein, wherein the airbag module is disposed rearward of the head pipe; and a pair of left and right bag-mooring members provided for retaining the airbag at a position facing the occupant upon expansion and deployment of the airbag, wherein the bag-mooring members are arranged along the main frame and have one ends connected to the airbag and the other ends connected to the main frame at a position below the occupant seat.

16 Claims, 11 Drawing Sheets

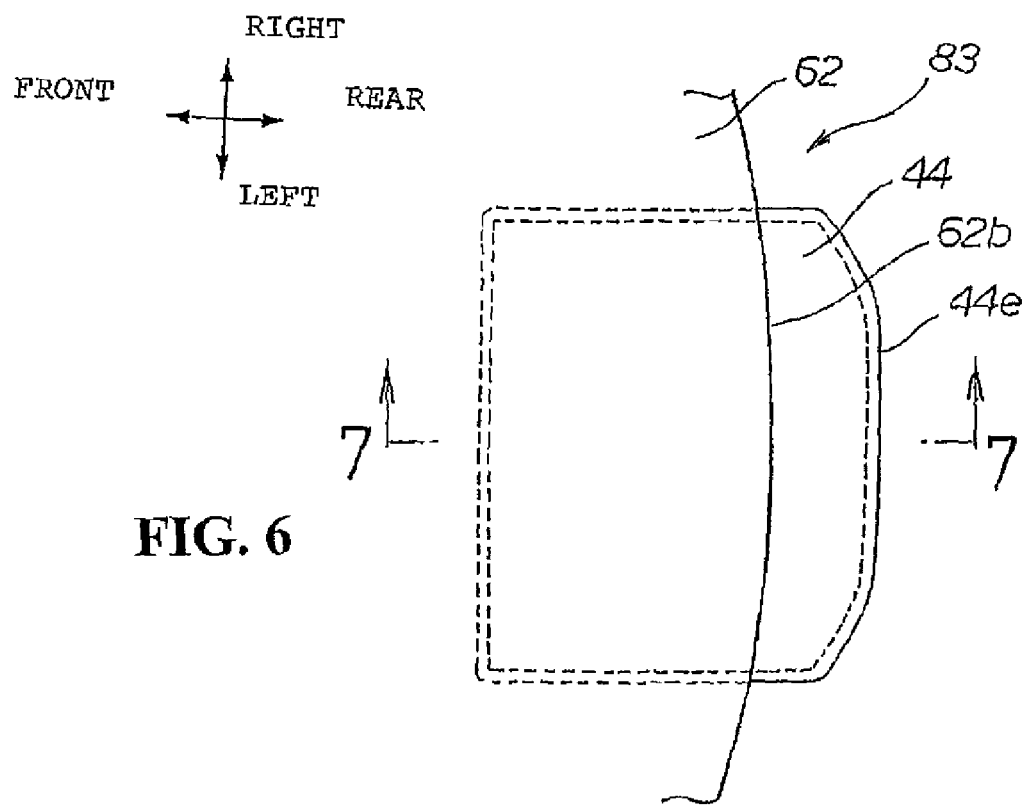
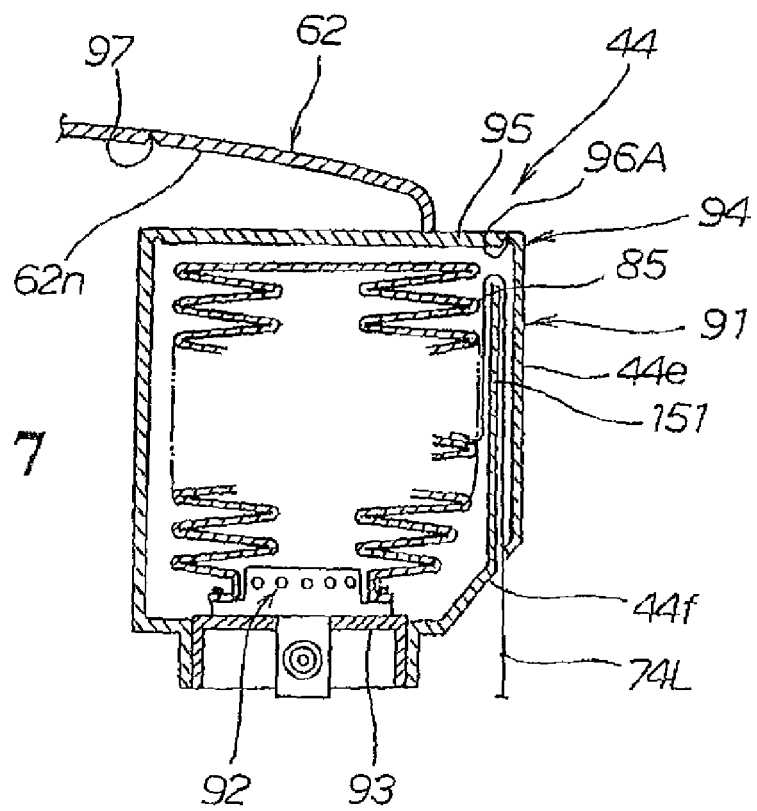

ately change the attachment position of the other end of the bag-mooing mem-
LOW-FLOOR TYPE VEHICLE

CROSS-REFERENCE TO RELATED APPLICATIONS

This nonprovisional application claims priority under 35 U.S.C. §119(a) on Patent Application No. 2007-338145, filed in Japan on Dec. 27, 2007, the entirety of which is incorporated herein by reference.

BACKGROUND OF THE INVENTION

1. Field of the Invention

The present invention relates to a vehicle, and more particular, to a low-floor type vehicle equipped with an airbag module at the front portion thereof.

2. Background of the Invention

There is known a motorcycle equipped with an airbag device expanding upon clash or the like (see e.g. Japanese Patent Laid-open No. 2007-83954).

In FIG. 17 of Japanese Patent Laid-open No. 2007-83954, a motorcycle 100 includes a steering handlebar 104, an airbag device 120 provided rearward of the handlebar 104, a fuel tank 106 provided rearward of the airbag device 120, and a seat 103 provided rearward of the fuel tank 106. Webbing 140 (hereinafter "the bag-mooring members 140") is provided between the airbag device 120 and a vehicle body to guide and retain an airbag at an appropriate position upon rapid expansion of the airbag. The expansion and deployment of the airbag can appropriately be done by these bag-mooring members 140.

However, it is difficult to employ the arrangement of the bag-mooring members 140 applied to the motorcycle 100 on a low-floor type vehicle, which is significantly different from the motorcycle 100 in vehicle-body structure and in occupant-mounting posture.

Consequently, it is necessary to smoothly guide a bag-mooring member in the deploying direction thereof for scooter-type vehicles.

SUMMARY OF THE INVENTION

It is all object of the present invention to provide a technique of smoothly guiding a bag-mooring member in the deploying direction thereof in a low-floor type vehicle installed with an airbag device.

To achieve the object, in a first aspect of the present invention, a low-floor type vehicle includes: a head pipe turnably supporting a steeling handlebar steerable by al occupant; a main frame extending downwardly rearward from the head pipe; an occupant seat provided rearward of the head pipe and adapted to allow the occupant to sit thereon; a straddle space defined between the occupant seat and the steering handlebar and straddlable by the occupant; an airbag module provided forward of the occupant seat and storing an airbag therein, wherein the airbag module is disposed rearward of the head pipe; and a pair of left and right bag-mooring members provided for retaining the airbag at a position facing the occupant upon expansion and deployment of the airbag, wherein the bag-mooring members are arranged along the main frame and have one ends connected to the airbag and the other ends connected to the main frame at a position below the occupant seat.

In a second aspect of the present invention, the main frame is covered by a cowl and the bag-mooring members are arranged along a space defined between the main frame and the cowl.

In a third aspect of the present invention, the cowl is formed in an inner surface with a fragile portion along the bag-mooring members.

In a fourth aspect of the present invention, the main frame includes a pair of left and light upper frames extending downwardly rearward from an upper portion of the head pipe, a pair of left and right lower frames extending downwardly rearward from a lower portion of the head pipe, and connecting members, each of the connecting members being vertically spanned between one of the upper frames and a corresponding one of the lower frames, and wherein the other end of each of the bag-mooring members is connected to a corresponding one of the connecting members.

In the first aspect of the present invention, the airbag is connected to the main frame by using the pair of left and right bag-mooring members retaining the airbag at a position facing the occupant and the bag-mooring members are arranged along the main frame. Since the other ends of the bag-mooring members are connected to a position below the occupant seat, the airbag can be moored at a position near the occupant upon deployment of the airbag.

The pair of left and right bag-mooring members is arranged along the main frame. Upon expansion and deployment of the airbag, one ends (the front ends) of the bag-mooring members as connecting portions to the airbag are first lifted. Along with the expansion and deployment of the airbag, the bag-mooring members are lifted along the main frame from the one ends (the front ends) of the bag-mooring members toward the other ends (the rear ends). As described above, the bag-mooring members are arranged along the main frame. Therefore, it is possible for the bag-mooring members to smoothly guide the airbag in the deploying direction thereof.

In the second aspect of the present invention, the main frame is covered by the cowl and the bag-mooring members are arranged along the space defined between the main frame and cowl. Therefore, during non-operation of the airbag device, the bag-mooring members are covered by the cowl. Because of this, it is possible to make it difficult to impair the external appearance of the vehicle.

In the third aspect of the present invention, the cowl is formed in an inner surface with the fragile portion along the bag-mooring members.

When the airbag is deployed, the bag-mooring members hit the fragile portion formed in the internal surface of the cowl to form the opening at a portion of the cowl. The bag-mooring members are drawn out of the opening. Thus, it is possible to smoothly deploy the airbag.

In the fourth aspect of the present invention, the position of the other end of the bag-mooring members may be changed depending on the type of vehicle in some cases. In such a case, the other end of the bag-mooring members is connected to the connecting member vertically spanned between the upper and lower frames. This makes it easy to vertically change the attachment position of the other end of the bag-mooing member. Thus, the invention can be applied to many types of vehicle, which can prevent or reduce the cost increase of a vehicle.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow arid the accompanying drawings which are given by way of illustration only, and thus are not limitative of the present invention, and wherein:

FIG. 6 is a plan view for assistance in explaining the arrangement relationship between an airbag module and a cowl according to an embodiment of the present invention;

FIG. 7 is a cross-sectional view taken along line 7-7 of FIG. 6.

DETAILED DESCRIPTION OF THE PREFERRED EMBODIMENTS

Figure 1:
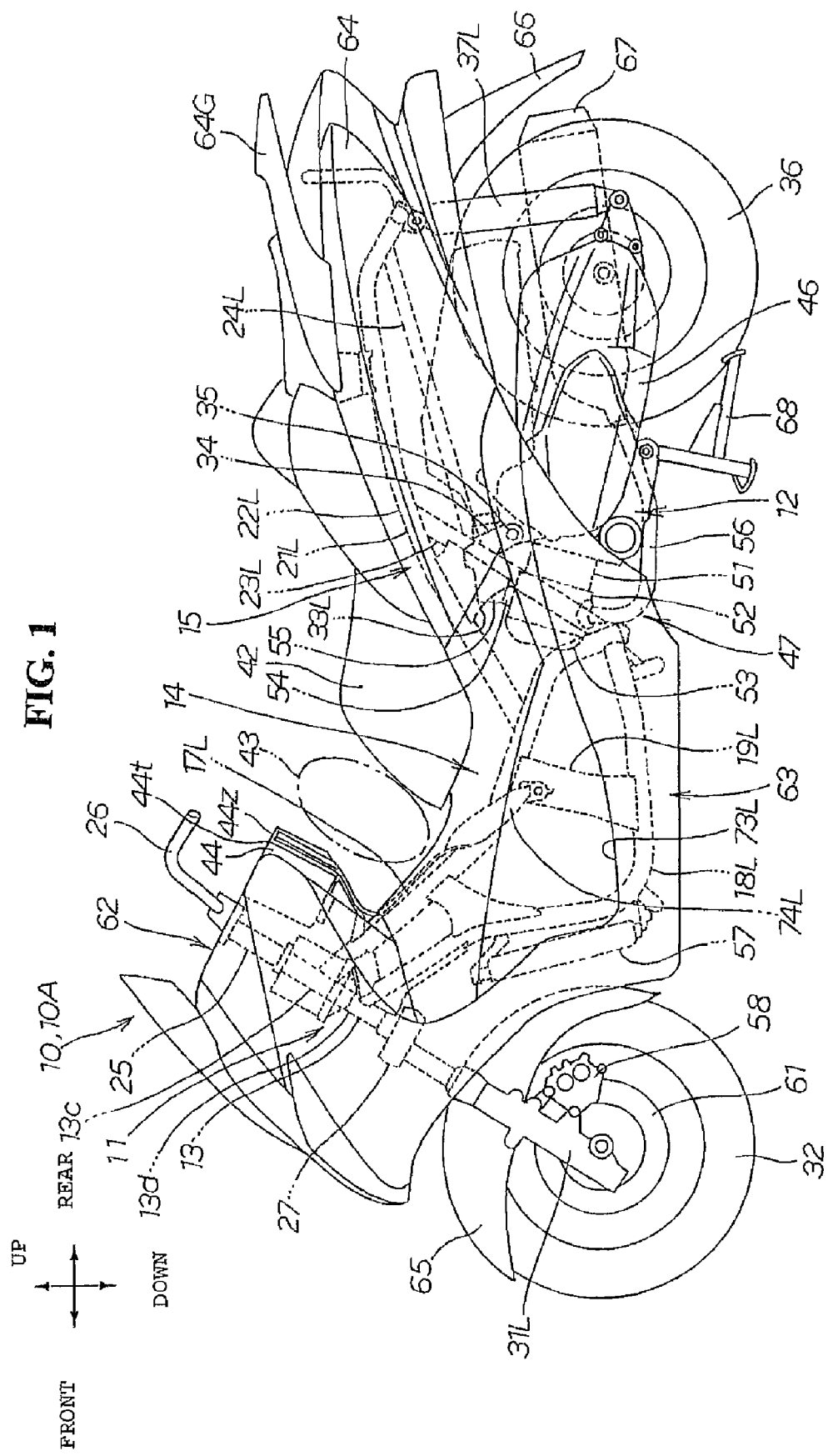
FIG. 1 is a left lateral view of a low-floor type vehicle according to an embodiment of the present invention.

The present invention will low be described in detail with reference to the accompanying drawings, wherein the same reference numerals will be used to identify the same or similar elements throughout the several views. It should be noted that the drawings should be viewed in the direction of orientation of the reference numerals.

In the drawings, "the front," "the back or rear," "the left," "the right," "the upside" and "the downside" each indicate the direction a rider looks. It is to be noted that the drawings shall be viewed based on the orientation of reference numerals or symbols.

FIG. 1 is a left lateral view of a low-floor type vehicle according to an embodiment of the present invention. A scooter-type motorcycle 10A as one type of low-floor type vehicles 10 includes a body frame 11 and a power unit 12 suspended by the body frame 11 and serving as a drive source.

The body frame 11 includes a head pipe 13, a main frame 14 joined at a leading end to the head pipe 13 and extending downwardly rearward from the head pipe 13, and a rear frame 15 joined to the main frame 14 and extending rearward.

The main frame 14 includes a pair of left and right upper frames 17L, 17R (only reference numeral 17L on the front side is shown and this applies to the following) extending downwardly rearward from an upper portion 13c of the head pipe 13, and a pair of left and light lower frames 18L, 18R (only reference numeral 18L on the front side is shown and this applies to the following) extending downwardly rearward from a lower portion 13d of the head pipe 13. A pair of connecting members 19L and 19R (only reference numeral 19L on the front side is shown and this applies to the following) are spanned between the upper frame 17L and the lower frame 18L and between the upper frame 17R and the lower frame 18R, respectively, to increase the rigidity of the main frame 14.

The rear frame 15 includes seat rails 21L, 21R (only reference numeral 21L on the front side is shown and this applies to the following), middle frames 23L, 23R (only reference numerals 23L on the front side is shown and this applies to the following), and rail stays 24L, 24R (only reference numeral 24L on the front side is shown and this applies to the following). The seat rails 21L and 21R extend obliquely rearward upward from the respective rear portions of the upper frames 17L and 17R, respectively. The middle frames 23L and 23R connect respective intermediate points 22L and 22R (only reference numeral 22L on the front side is shown and this applies to the following) of the seat rails 21L and 21R with the respective rear ends of the upper frames 17L and 17R, respectively. The rail stays 24L and 24R are spanned between the upper portion of the middle frames 23L aid the rear portion of the seat rail 21L and between the upper portion of the middle frame 23R and the rear portion of the seat rail 21R, respectively.

A steering shaft 25 is provided on the head pipe 13 constituting a leading end portion of the body frame 11. The steering handlebar 26 steered by the occupant is turnably supported by the upper end of the steeling shaft 25. Front forks 31L, 31R (only reference numeral 31L on the front side is shown and this applies to the following) are attached to the lower end of the steering shaft 25 via a bottom bridge 27 formed generally triangular as viewed from above. A front wheel 32 is rotatably mounted between the lower ends of the front forks 3IL, 31R.

Pivot plates 33L and 33R (only reference numeral 33L on the front side is shown and this applies to the following) are spanned between the seat rail 21L and the middle frame 23L and between the seat rail 21R and the middle frame 23R, respectively. The pivot plates 33L, 33R are provided with respective link members 34 extending downward therefrom. The link members 34 are provided with a support shaft 35. The power unit 12 also serving as a rear swing arm is vertically swingably mounted by the support shaft 35. A rear wheel 36 as a drive wheel is rotatably mounted to the rear end portion of the power unit 12. Rear cushion units 37L and 37R (reference numeral 37L on the front side is shown and this applies to the following) for absorbing a shock from the road surface are spanned between the power unit 12 and the seat rail 21L and between the power unit 12 and the seat rail 21R, respectively.

An occupant seat 42 is mounted on the upper surfaces of the seat rails 21L, 21R. The occupant seat 42 is provided rearward of the head pipe 13. A straddle space 43 straddled by the occupant is formed between the steering handlebar 26 turnably supported by the head pipe 13 and the occupant seat 42 on which the occupant sits. An airbag module 44 housing an airbag therein is installed forward of the occupant seat 42.

The airbag module 44 is disposed rearward of the head pipe 13 so as to partially overlap the head pipe 13 when the head pipe 13 is viewed from the front. In other words, at least a portion of the airbag module 44 is disposed within the vertical width H of the head pipe 13 as viewed from the side and the airbag module 44 is disposed to vertically overlap the head pipe 13 in the height-direction of the head pipe 13 as viewed from the front. That is to say, since the airbag module 44 is disposed to partially overlap the head pipe 13, the height of the upper end surface 44t of the airbag module 44 can be suppressed to a low level. If the height of the upper end surface 44t can be suppressed to a low level, a space can be ensured above the airbag module 44. As a result, the flexibility of member-layout in the vicinity of the steeling handlebar 26 can be enhanced in the height-direction.

In the illustrated embodiment, the airbag module 44 is disposed below the steering handlebar 26. Therefore, the flexibility of designing the steering handlebar 26 and the periphery thereof can be enhanced. For example, flexibility with respect to the arrangement of the steering handlebar 26 and members in the vicinity of the steering handlebar 26 is enhanced. In addition, a portion 44z of the airbag module 44 is provided to face the straddle space 43.

The power unit 12 includes a transmission unit 46 incorporating a belt-type transmission and an engine 47 extending forwardly from the front end of the transmission unit 46.

The engine 47 is a multi-cylinder water-cooled 4-cycle engine, in which a cylinder block 51, a cylinder head 52 and a cylinder head cover 53 are mounted to the transmission unit 46 in this order. An air cleaner unit 55 is connected to the upper surface of the cylinder head 52 via an intake pipe 54. An exhaust pipe 56 is joined to the lower surface of the cylinder head 52.

In addition, the low-floor type vehicle 10 further includes a radiator unit 57 for cooling the engine 47, a front disk brake unit 58, a front brake disk 61, a front cowl 62 covering the vehicle from the front, a main cowl 63 covering the side of the vehicle, a rear cowl 64, a grab rail 64G, a front fender 65, a rear fender 66, a silencer 67 coupled to the rear end of the exhaust pipe 56, and a main stand 68.

Figure 2:
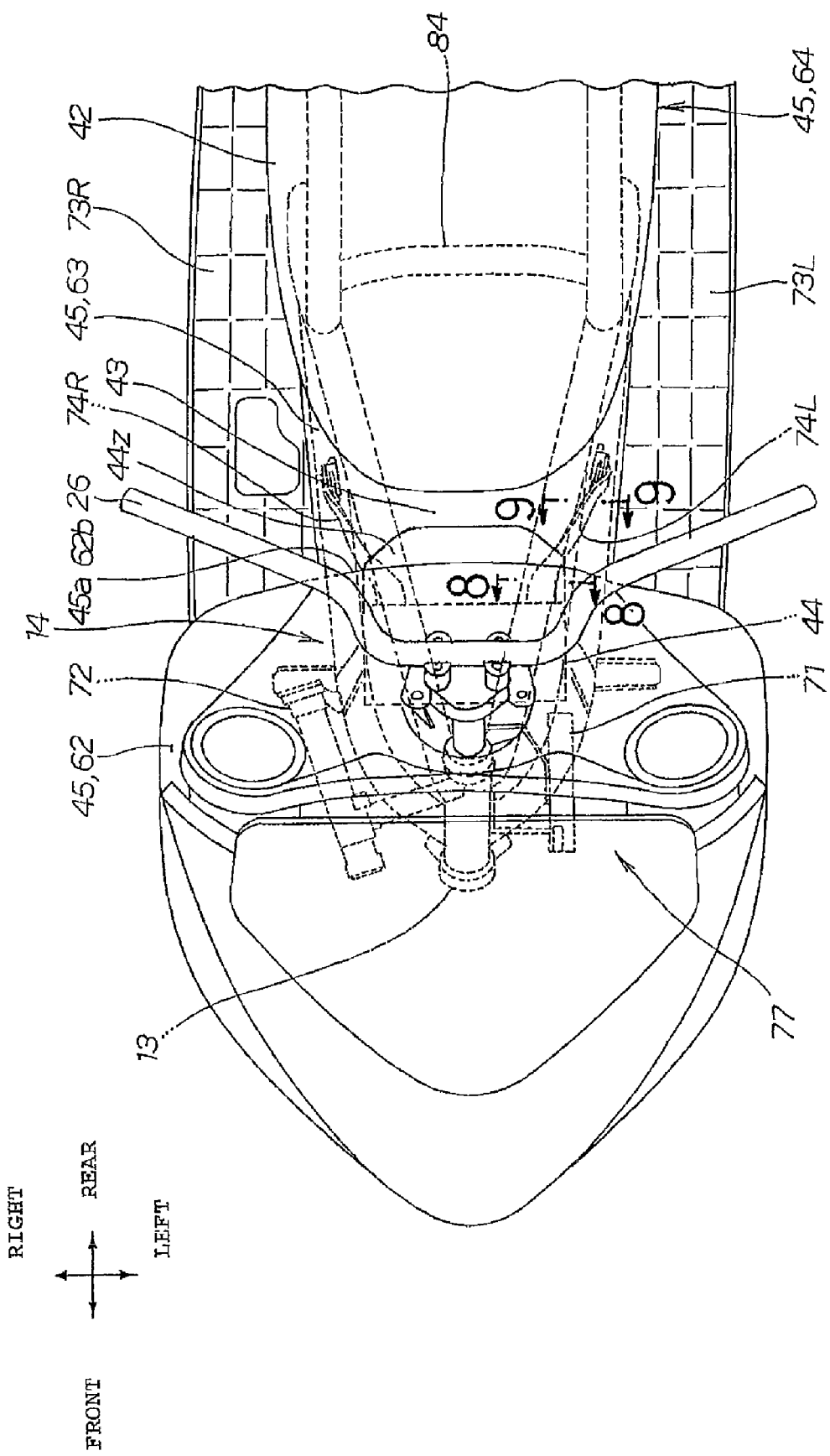
FIG. 2 is a plan view of an essential portion of the low-floor type vehicle according to an embodiment of the present invention.

FIG. 2 is a plan view of an essential portion of the low-floor type vehicle according to an embodiment of the present invention. The airbag module 44 mentioned above is disposed rearward of the head pipe 13. An airbag control unit 71 for controlling the deployment of the airbag stored in the airbag module 44 is disposed on the left side of the head pipe 13. A key cylinder 72 is disposed on the light side of the head pipe 13. The key cylinder 72 is adapted to receive a key inserted thereinto when the power of the vehicle is turned on or off.

The head pipe 13, the airbag module 44 and the airbag control unit 71 constituting the front portion of the body frame 11 are covered by the front cowl 62 as a constituent element of the cowl 45. A portion 44z of the airbag module 44 is provided to face the straddle space 43 from the rear surface 62b of the front cowl 62 as the outer surface 45a of the cowl 45. The main cowl 63 as a constituent element of the cowl 45 is provided below the straddle space 43 to cover the main frame 14. The occupant seat 42 is disposed rearward of the airbag module 44. Step floors 73L and 73R are respectively provided at left and right side lower portions of the occupant seat 42. The step floors 73L, 73R each has a generally horizontal surface and serves as a footrest on which the occupant's foot is placed. The rear cowl 64 covers from the left and right sides of the passenger seat 42 to the rear portion of the vehicle. That is to say, the cowl 45 covers the body frame 11 and constitutes the external appearance surface of the vehicle. In addition, the cowl 45 includes the front cowl 62, the main cowl 63 and the rear cowl 64 in this order from the front to rearward of the vehicle.

Bag-mooring members 74L and 74R (only reference numeral 74L on the front side is shown and this applies to the following) are respectively for retaining the airbag at respective predetermined positions when the airbag is expanded and deployed. In addition a cross member 84 is spanned between the lower frames 18L, 18R.

Figure 3:
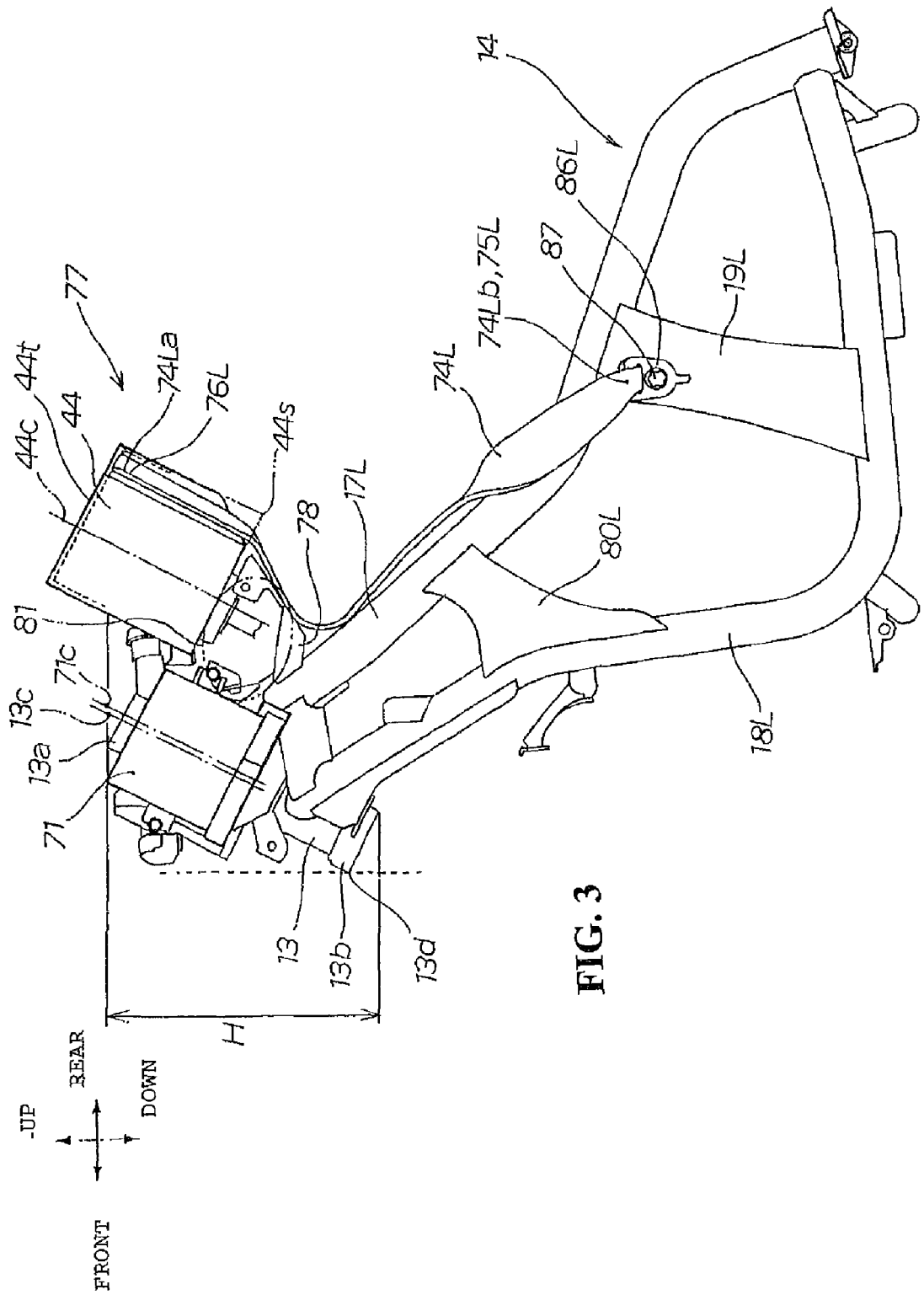
FIG. 3 is a lateral view of a main frame mounted thereon with an airbag device according to an embodiment of the present invention.
Figure 4:
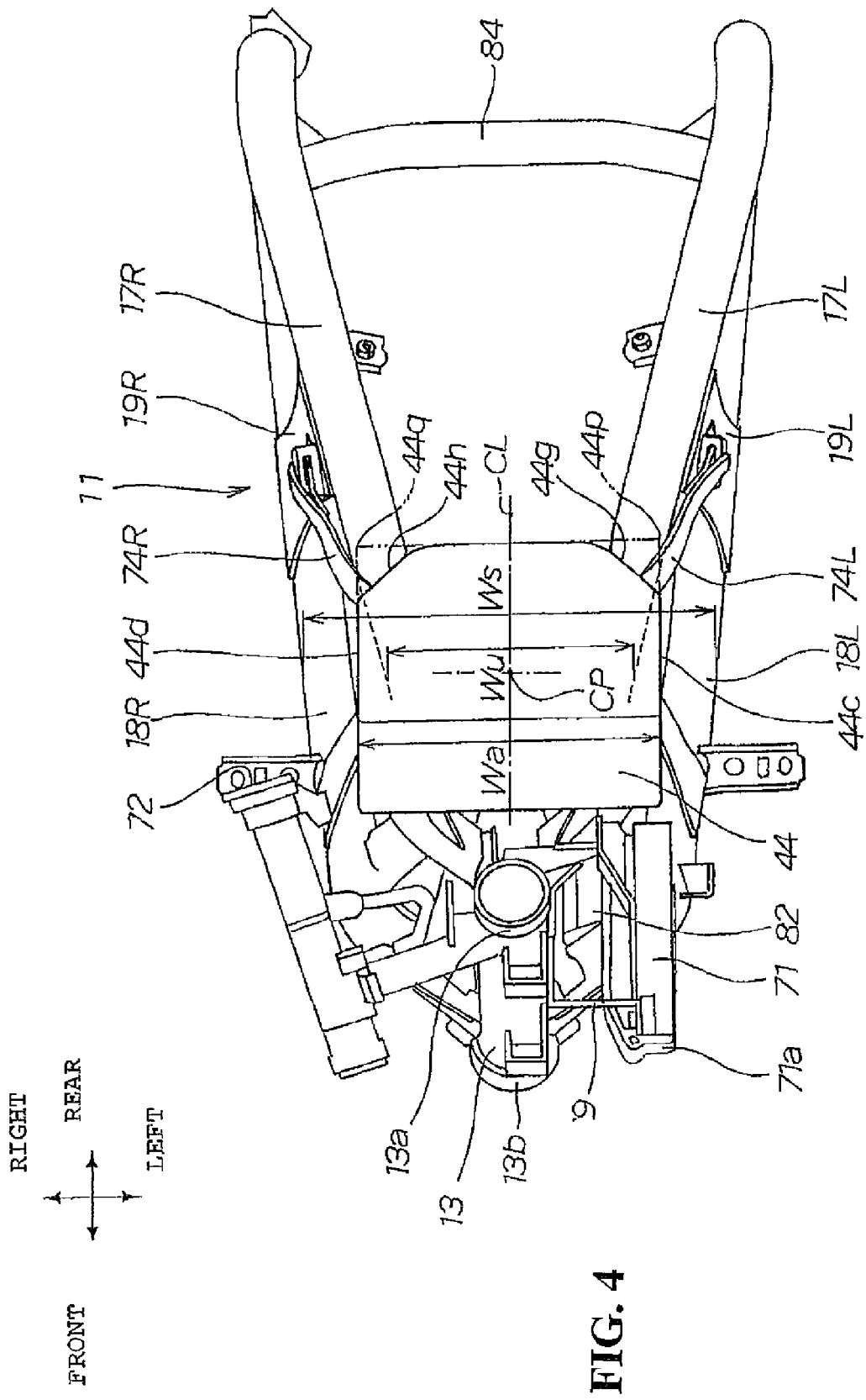
FIG. 4 is a plan view of the main frame mounted thereon with the airbag device according to an embodiment of the present invention.
Figure 5:
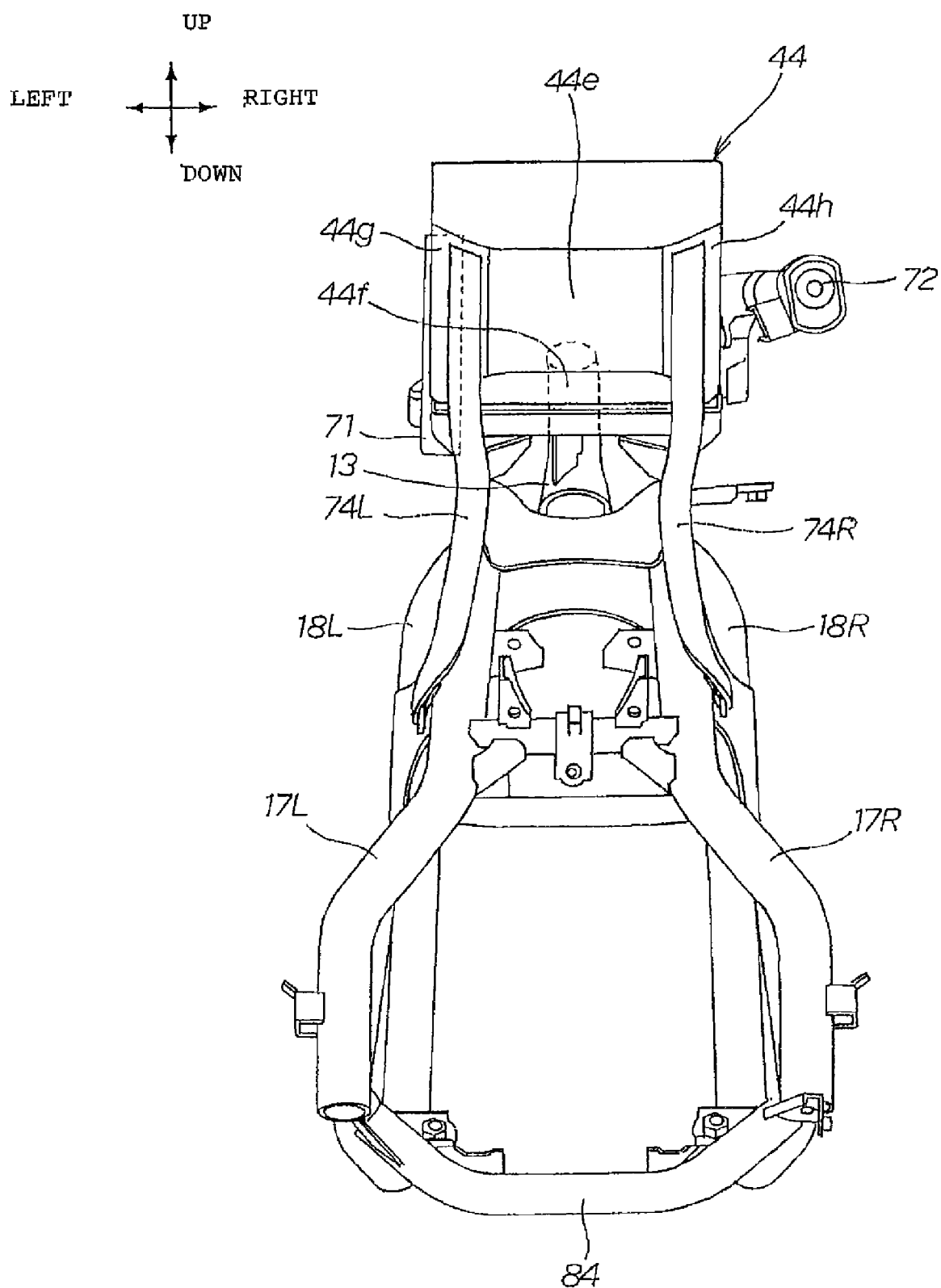
FIG. 5 is a rear view of the main frame mounted thereon with the airbag device according to an embodiment of the present invention.

FIGS. 3 to 5 describe the arrangement among the airbag module 44 constituting the airbag device 77, the main frame 14, the bag-mooring members 74L, 74R connecting between the airbag module 44, and the bag control unit 71 for controlling the deployment of the airbag.

FIG. 3 is a lateral view of the main frame on which the airbag device is mounted according to an embodiment of the present invention. A bracket 78 is provided to extend from a generally upper portion of the tipper frames 17L, 17R. The airbag module 44 is mounted to the bracket 78. The airbag module 44 has a lower end edge 44s.

The ends 74La, 74Ra (only reference numeral 74La on the front side is shown and this applies to the following) of the bag-mooring members 74L, 74R are respectively secured to the airbag module 44. The other ends 74Lb and 74Rb (only reference numeral 74Lb on the front side is shown and this applies to the following) of the bag-mooring members 74L, 74R are secured to the connecting members 19L and 19R, respectively. The bag-mooring members 74L, 74R are explained in more detail later. Reference numerals 80L, 80R (only reference numeral 80L on the front side is shown and this applies to the following) in FIG. 3 denote connecting stays, one of which connects between the upper frame 17L and the lower frame 18L and the other of which connects between the upper frame 17R and tile lower frame 18R.

FIG. 4 is a plan view of the main frame on which the airbag device is mounted according to an embodiment of the present invention. The body frame 11 includes a pair of the left and right upper frames 17L, 17R provided to extend downward rearward from the upper portion of the head pipe 13 and a pair of the left and right lower frames 18L, 18R provided to extend downward rearward from the lower portion of the head pipe 13. When the body frame 11 is viewed from above, with respect to the anteroposterior center CP, both left and right lateral surfaces 44c, 44d of the airbag module 44 are disposed outside a left-right external width Wu of the upper frames 17L, 17R and inside a left-right external width Ws of the lower frames 18L, 18R.

Both the left and right lateral surfaces 44c, 44d of the airbag module 44 are disposed outside the upper frames 17L, 17R. Therefore, the airbag module 44 can ensure a sufficient widthwise-length. Because of this, when deployed, the airbag (see reference numeral 85 in FIG. 7 described later) can be smoothly deployed from side to side.

Both the left and right lateral surfaces 44c, 44d of the airbag module 44 are disposed inside the left-right external width Ws of the lower frames 18L, 18R. Therefore, enlargement of the vehicle-width can be avoided. That is to say, the length of the external width Wa of the airbag module 44 is set to such an optimum width-length so as to provide the relationship of Wu<Wa<Ws. This can achieve a balance between the sufficient deployment performance and compactness of the airbag module 44.

The airbag control unit 71 is disposed vehicle-widthwise laterally of the head pipe 13. Specifically, a stay 79 is provided to extend leftward from the head pipe 13 and the airbag control unit 71 is secured to the stay 79.

The head pipe 13 is slantwise arranged so that a lower end 13b is located forward of an tipper end 13a. A front end 71a of the airbag control unit 71 is disposed rearward of the lower end 13b of the head pipe 13. Thus, when the vehicle takes an impact from the front, the impact force is first transmitted to and absorbed by the lower end 13b of the head pipe 13. This makes it difficult for the impact force to be transmitted to the airbag control unit 71. Therefore, the airbag control unit 71 can be protected.

Referring to FIGS. 3 and 4, the airbag module 44 and the airbag control unit 71 are arranged to be offset from each other in the height-direction.

A space 81 is provided rearward of the airbag control unit 71 to permit the movement of the airbag control unit 71. Because of this, even if the airbag control unit 71 takes an impact to be moved rearward, it can be accommodated in the movement space 81 of the airbag control unit 71. It is possible, therefore, to make the airbag control unit 71 unsusceptible to external force.

When the vehicle is viewed from the side, a central axis 44c of the airbag module 44 and a central axis 71c of the airbag control unit 71 are arranged parallel to the direction of an axis 13c of the head pipe 13. Since the airbag module 44 and the airbag control unit 71 are provided parallel to the direction of the axis 13c of the head pipe 13, a structure in the vicinity of the head pipe 13 can be simplified and made compact.

The pair of left and right bag-mooring members 74L, 74R is joined to the airbag (see reference numeral 85 of FIG. 7 described later) to retain the airbag 85 at a position facing an occupant during expansion and deployment of the airbag 85. The bag-mooring members 74L and 74R are connected to the main frame 14 via the connecting members 19L and 19R, respectively.

The bag-mooring members 74L, 74R are arranged along the main frame 14. In addition, rear ends 75L and 75R (only reference numeral 75L on the front side is shown) as the respective ends 74Lb and 74Rb of the bag-mooring members 74L and 74R are respectively connected to the connecting members 19L and 19R via retainers 86L and 86R (only reference numeral 86L on the front side is shown and this applies to the following) and via bolts 87, 87 seeming the retainer 86L and 86R.

The bag-mooring members 74L, 74R may be made by weaving the same resin-fiber yarn as the vehicle seatbelt or using the same material as that of the airbag 85. The material, structure, sectional shape, etc. of the bag mooring members 74L, 74R may be optionally set as long as they have a predetermined function and strength taking into account a secular change and the like.

In the illustrated embodiment, the respective ends 74Lb and 74Rb of the bag-mooring members 74L and 74R are connected to the connecting members 19L and 19R, respectively. However, the respective positions of the ends 74Lb, 74Rb of the bag-mooring members 74L and 74R may be changed depending on the type of vehicle in some cases. In such a case, the respective connecting positions of the ends 74Lb, 74Rb of the bag-mooring members 74L, 74R to the connecting members 19L, 19R can be changed to any positions. For this reason, the cost of the vehicle can be reduced when the airbag device 77 is mounted on a different type of vehicle.

FIG. 5 is a rear view of the main frame on which the airbag device is mounted according to an embodiment of the present invention. When the vehicle is viewed from the rear, the airbag control unit 71 is disposed to at least partially overlap the airbag module 44. The airbag module 44 is formed boxlike. In addition, the lower end edge 44s provided at the rear surface 44e of the airbag module 44 is chamfered by forming a lower edge-chamfered portion 44f thereat. Therefore, the straddle space 43 can be enlarged. This enlarged straddle space 43 can further enhance occupant mount-dismount and comfort.

With reference to FIG. 4, the airbag module 44 is formed boxlike. In addition, left and right end edges 44p and 44q provided at the rear surface 44e of the airbag module 44 are chamfered by a left edge-chamfered portion 44g and by a right edge-chamfered portion 44h, respectively. Therefore, the straddle space 43 can be enlarged. Since the straddle space 43 is sufficiently enlarged, mounting on and dismounting from the vehicle can be further facilitated and occupant comfort at the time of mounting on the vehicle can be enhanced.

On the side of the head pipe 13, the key cylinder 72 for turning on or off a power supply to the vehicle is disposed on the right side, i.e., on one side. In addition, the airbag control unit 71 is disposed on the left side, i.e., on the other side, with the head pipe 13 put therebetween. Thus, a space (see reference numeral 82 of FIG. 4) on the side opposite to the key cylinder 72 can be effectively utilized.

FIG. 6 is a plan view for assistance in explaining the arrangement relationship between the airbag module and the cowl. The front cowl 62 is provided at the front portion 83 of the vehicle. The rear surface 44e of the airbag module 44 protrudes outwardly from the rear surface 62b forming the external surface of the front cowl 62. The rear surface 44e constituting part of the airbag module 44 protrudes rearward from the external surface of the cowl 62. Therefore, an occupying space of the airbag module 44 occupying the inside of the front cowl 62 can be reduced. Because of this, the layout flexibility of the other members in the front cowl 62 can be enhanced.

FIG. 7 is a cross-sectional view taken along line 7-7 of FIG. 6. The airbag module 44 housing the airbag 85 therein includes, as main constituent elements, a container portion 91, the airbag 85 folded and stored in the container portion 91, and an inflator 92 for generating gas used to expand and deploy the airbag 85.

The container portion 91 includes a bottom portion 93, a frame portion 94 including the rear surface 44e rising upward from the bottom portion 93 and left and right lateral surfaces (reference numerals 44c, 44d in FIG. 4) constituting part of the airbag module 44, and a lid portion 95 covering the frame portion 94 from above. A notched portion 96 is formed between the frame portion 94 and the lid portion 95 so as to make it possible to easily open the lid portion 95 from the frame portion 94 when the airbag 85 is expanded and deployed. The notched portion 96 is formed on the lid portion 95 to extend along the frame portion 94. In addition, a notch 97 is formed on an inside surface 62n of the front cowl 62 so as to enable the expansion-deployment of the airbag 85.

A partition wall 151 is provided between the rear surface 44e and the airbag 85. The bag-mooring members 74L, 74R are partially folded and stored between the partition wall 151 and the rear surface 44e.

With additional reference to FIG. 3, the airbag 85 is connected to the main frame 14 by using the pair of left and right bag-mooring members 74L, 74R retaining the airbag 85 at a position facing the occupant. In addition, the bag-mooring members 74L, 74R are disposed along the main frame 14.

The pair of left and light bag-mooring members 74L, 74R is disposed along the main frame 14. Therefore, when the airbag 85 is expanded and deployed, the respective front ends 76L, 76R of the bag-mooring members 74L, 74R serving as connecting portions with the airbag 85 are first lifted. As the expansion and deployment of the airbag 85 proceeds, the bag-mooring members 74L, 74R are lifted from the front ends 76L, 76R of the bag-mooring members 74L, 74R toward the rear ends 75L, 75R. As described above, since the bag-mooring members 74L and 74R are disposed along the upper frames 17L and 17R, respectively, constituting the main frame 14, it is possible for the bag-mooring members 74L, 74R to smoothly guide the airbag 85 hi the expanding direction thereof.

Figure 8A:
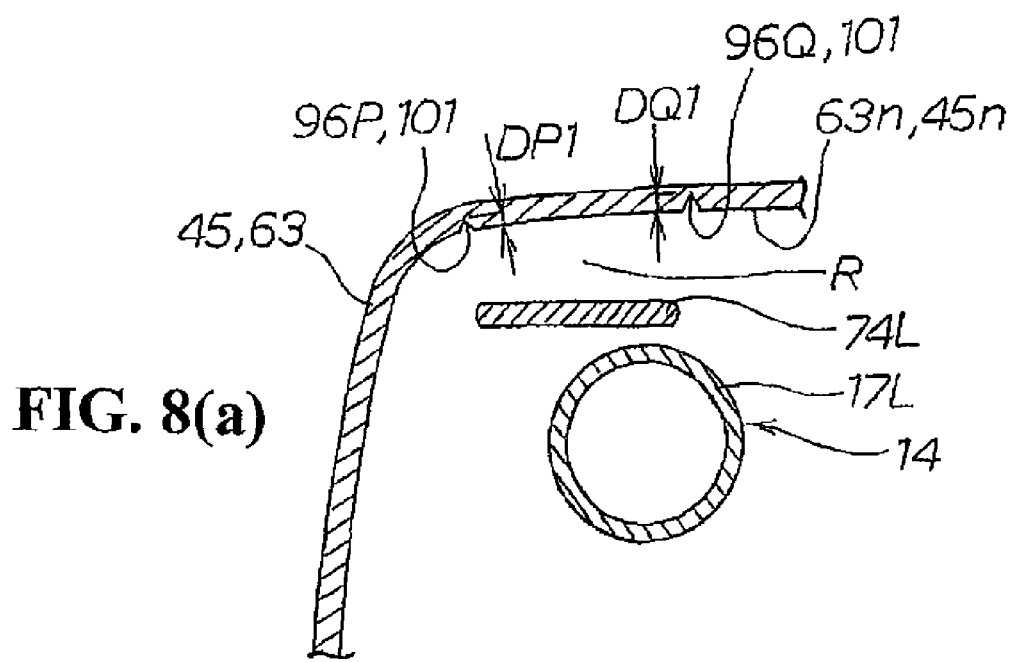
FIGS. 8(a) and 8(b) are cross-sectional views taken along line 8-8 of FIG. 2.
Figure 8B:
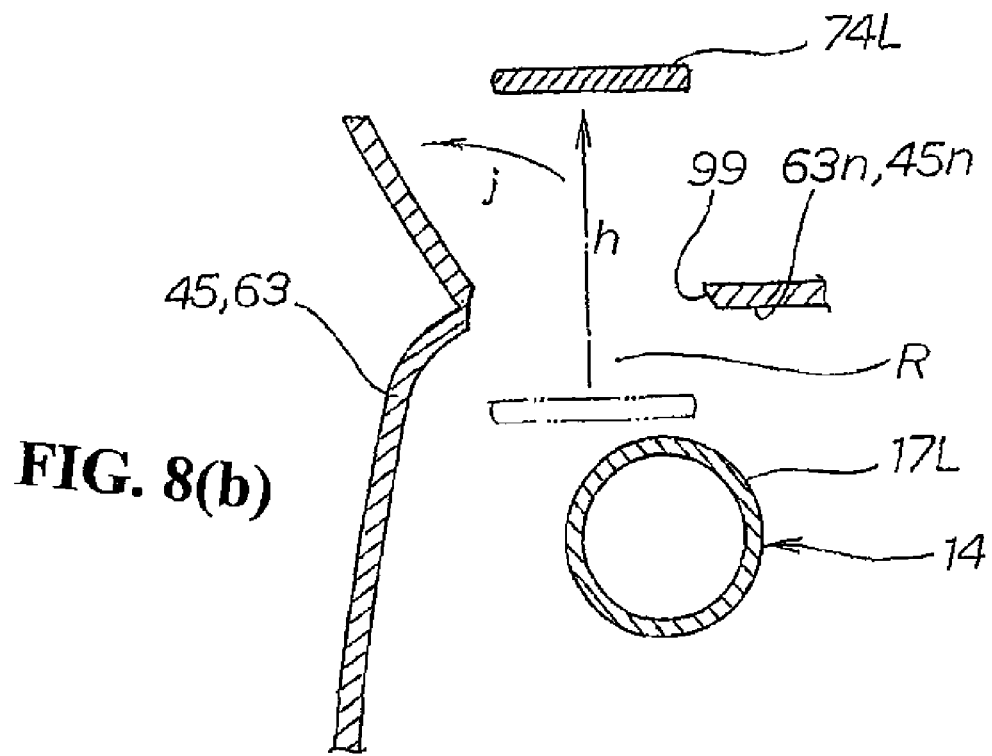

FIGS. 8(a) and 8(b) include cross-sectional views taken along line 8-8 of FIG. 2. In FIG. 8(a), the bag-mooring member 74L is disposed along a space R defined between the main frame 14 and the cowl 45 and the main frame 14 is covered by the main cowl 63 as a constituent element of the cowl 45.

The bag-mooring member 74L is disposed along the space R defined between the upper frame 17L constituting part of the main frame 14 and the main cowl 63. In addition, an inner surface 63n of the main cowl 63 is formed with two fragile portions 101 along the bag-mooring member 74L from side to side to allow the bag-mooring member 74L to smoothly function during operation of the airbag.

In addition, respective notched portions 96P and 96Q provided for the two left and right fragile portions 101, 101 are formed to have depths such that DP1<DQ1, where the notch depth of the external notched portion 96P is DP1 and that of the internal notched portion 96Q is DQ1.

During non-operation of the airbag device 77, the bag-mooring member 74L is covered by the cowl 45 (the main cowl 63). Since the bag-mooring member 74L is covered by the front cowl 62, the external appearance of the vehicle can be made satisfactory.

In FIG. 8(b), since the internal notch depth DQ1 is greater than the external notch depth DP1, the following occurs upon operation of the airbag device 77. The bag-mooring member 74L is moved in the direction of arrow h to hit and press the inner surface 63n of the main cowl 63. This allows the main cowl 63 to cause rupture at the internal notch portion 96Q and to be raised in the direction of arrow j around the external notch portion 96P, thereby allowing the cowl 45 to be formed with an opening 99. The bag-mooring member 74L can pass through the opening 99 and move in the direction of arrow h.

The bag-mooring member 74R disposed on the right side of the vehicle has the same configuration and function as those of the bag-mooring member 74L disposed on the left side; therefore, its explanation is omitted.

The main frame 14 is covered by the main cowl 63 as the cowl 45. The bag-mooring members 74L, 74R are disposed along the space R defined between the main frame 14 and the main cowl 63. Thus, when the airbag device 77 is operated, it is possible to smoothly guide the airbag (see reference numeral 85 in FIG. 7) in the deploying direction thereof.

Further, the inner surface 62n of the front cowl 62 as the inner surface 45n of the cowl 45 is formed with the fragile portions 101 along the bag-mooring members 74L, 74R. Thus, when the airbag 85 is deployed, the bag-mooring members 74L, 74R hit the corresponding fragile portions 101 formed on the inner surface 62n of the cowl 45 to form the opening 99 in the cowl 45 due to the fragile portions 101. In addition, the bag-mooring members 74L, 74R are drawn from the cowl 45 along the fragile portions 101. Thus, the airbag 85 can smoothly be deployed without interrupting the deployment of the airbag 85.

That is to say, even though the left and right bag-mooring members 74L, 74R are covered from above by the cowl 45, the opening 99 can be formed in the cowl 45 at the desired time. Thus, it is possible to smoothly guide the airbag 85 in the deploying direction thereof without impairing the movement of the left and right bag-mooring members 74L, 74R by the cowl 45.

Figure 9A:
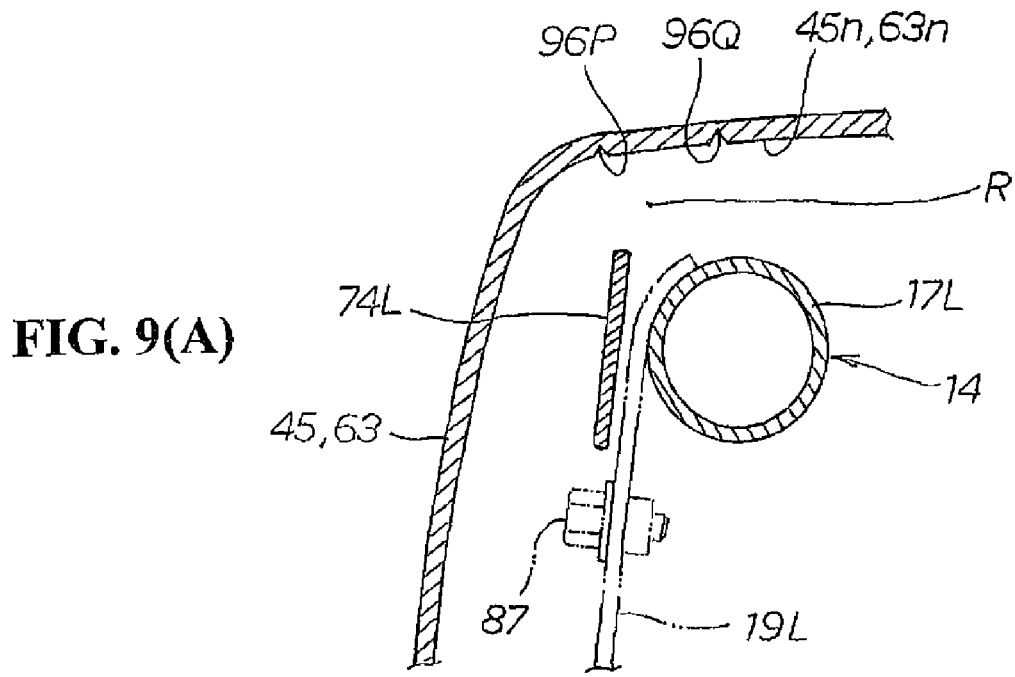
FIGS. 9(a) and 9(b) are cross-sectional views taken along line 9-9 of FIG. 2.
Figure 9B:
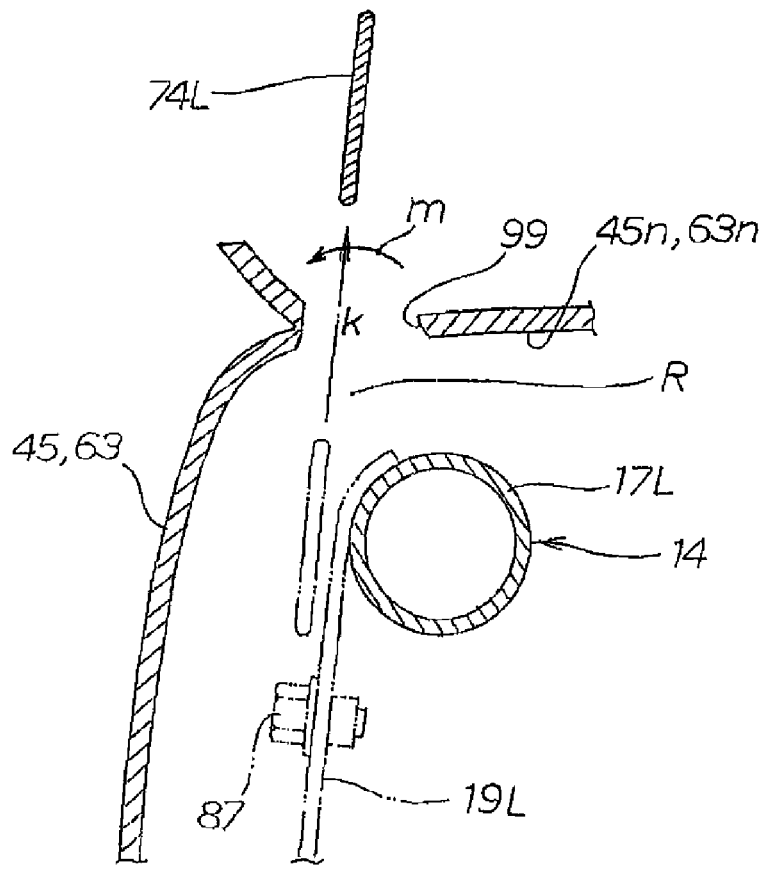

FIGS. 9(a) and 9(b) include cross-sectional views taken along line 9-9 of FIG. 2. The bag-mooring member 74L is disposed along the space R defined between the main frame 14 and the cowl 45.

In FIG. 9(a), during non-operation of the airbag device 77, the bag-mooring member 74L is covered by the cowl 45 (the main cowl 63).

In FIG. 9(b), upon operation of the airbag device 77, the bag-mooring member 74L is moved in the direction of arrow k to hit the inner surface 63n of the main cowl 63. This allows the main cowl 63 to cause rupture at the internal notched portion 96Q and to be raised in the direction of arrow m around the external notched portion 96P, thereby allowing the cowl 45 to be formed with the opening 99. The bag-mooring member 74L can pass through the opening 99 and move id the direction of arrow k.

A point in FIG. 9 largely different from FIG. 8 is that the bag-mooring member 74L is disposed in a direction different from that of FIG. 8. The other configurations and function are not largely different from those of FIG. 8.

In addition, the bag-mooring member 74R disposed on the right side of the vehicle has the same configuration and function as those of the bag-mooring member 74L disposed on the left side; therefore, its explanation is omitted.

The operation of the low-floor type vehicle will be described hereinbelow.

Figure 10A:
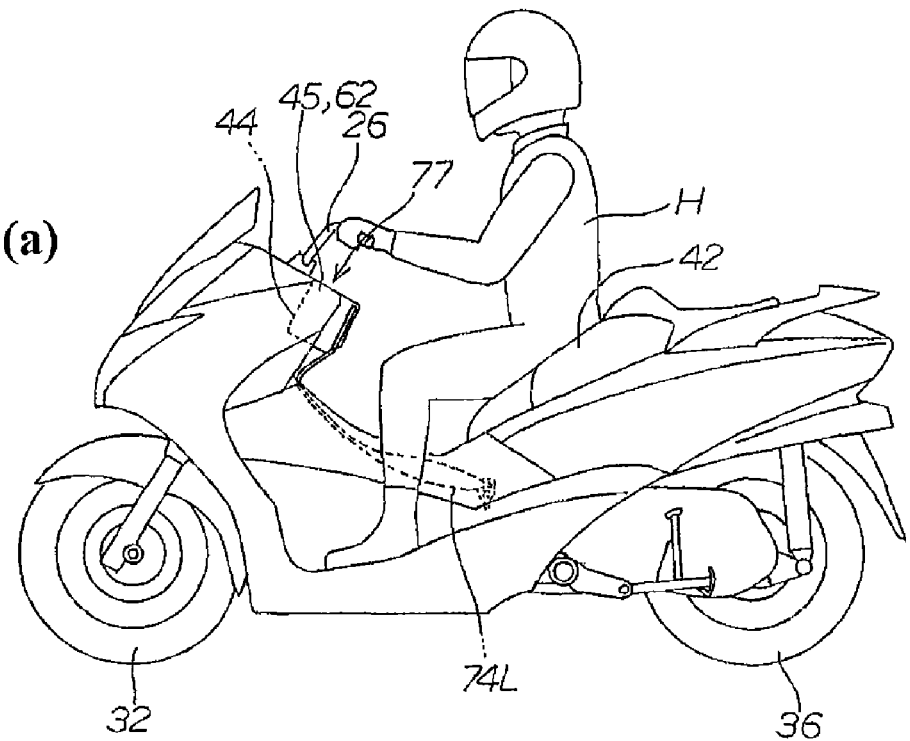
FIGS. 10(a) and 10(b) are operational explanatory views (during normal traveling—the initial time of deploying an airbag) of the airbag device according to an embodiment of the present invention.
Figure 10B:
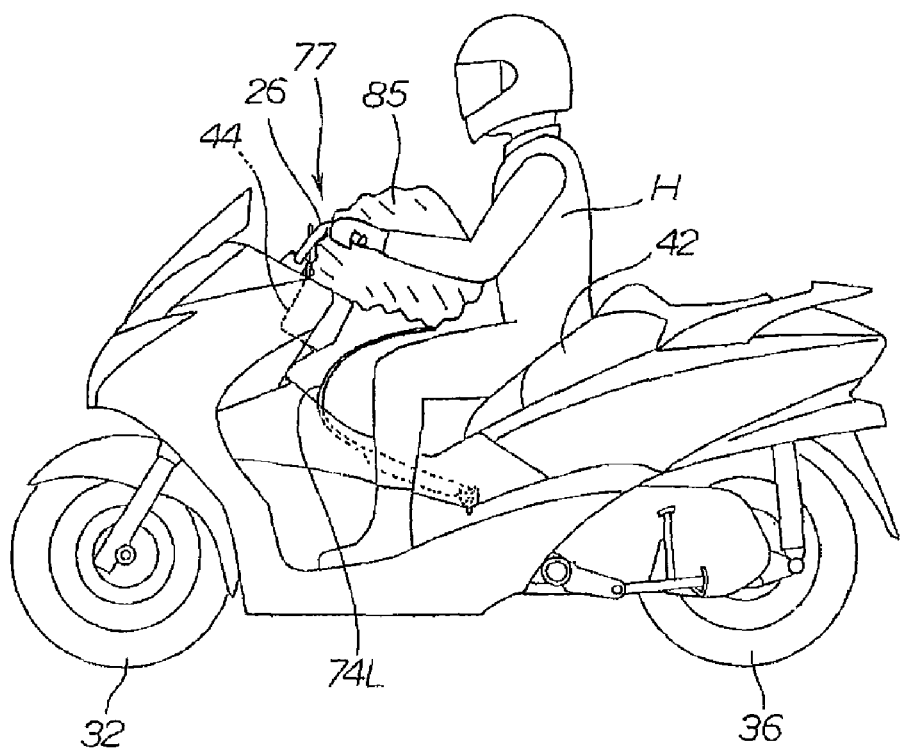

FIGS. 10(a) and 10(b) include operational explanatory views (during normal traveling—the initial deployment of the airbag) of the airbag device according to an embodiment of the present invention.

In FIG. 10(a), during the non-operation of the airbag device 77, the bag-mooring members 74L, 74R are stored inside the front cowl 62 as the cowl 45.

In FIG. 10(b), when the airbag device 77 is operated, the airbag 85 is expanded and deployed. Along with this, the bag-mooring members 74L, 74R attached to the airbag 85 are moved outwardly out of the opening 99 formed between the notched portions (reference numerals 96P, 96Q in FIGS. 8 and 9) due to the abutment of the bag-mooring members 74L, 74R.

Figure 11:
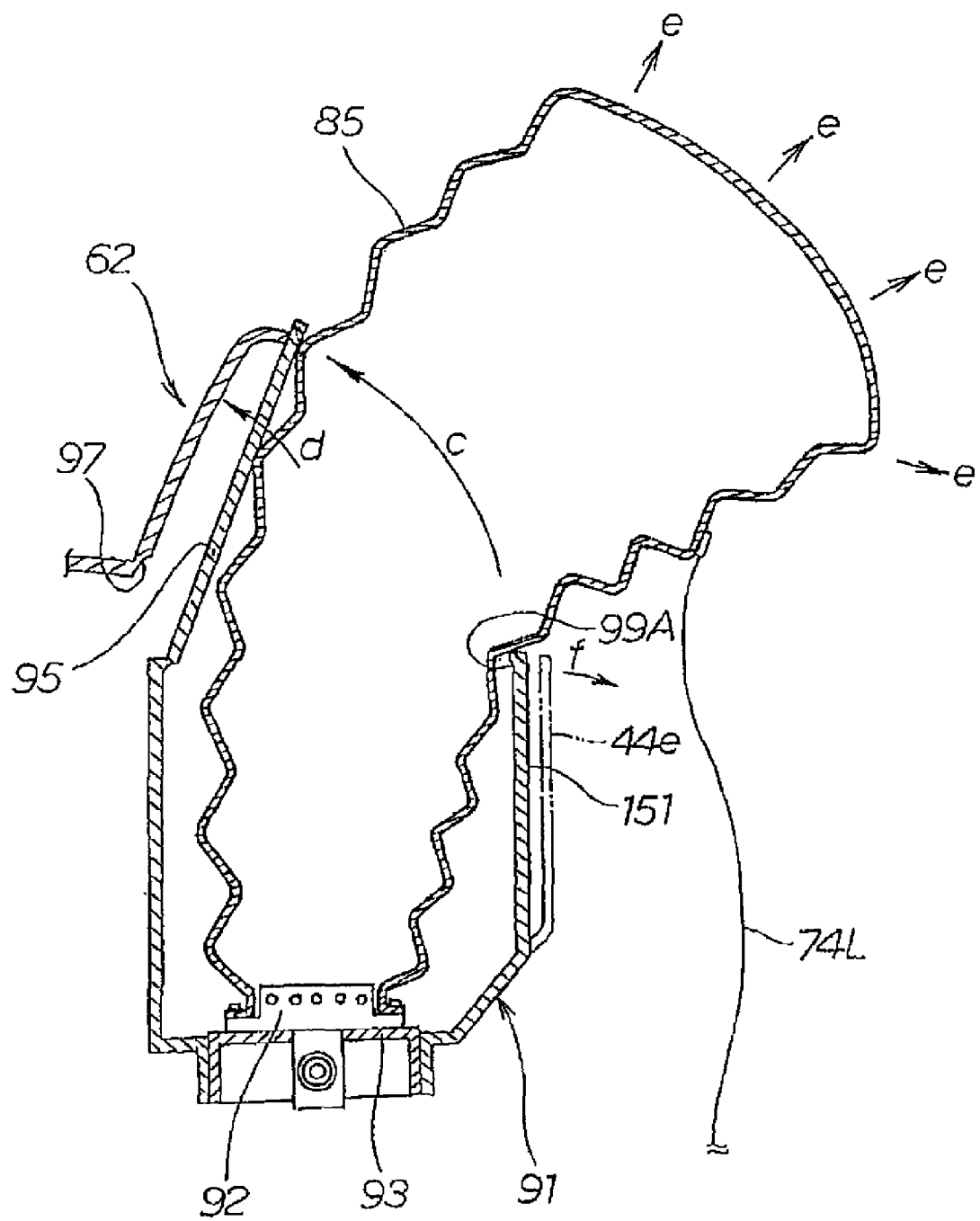
FIG. 11 is a cross-sectional view for assistance in explaining the fact that the upper surface of the airbag module is opened to deploy the airbag according to an embodiment of the present invention.

FIG. 11 is a cross-sectional view for assistance in explaining the fact that the upper surface of the airbag module is opened to deploy the airbag. When the airbag 85 is expanded and deployed, the expansion of the airbag 85 lifts the lid portion 95 in the direction of arrow c from the notched portion (see reference numeral 96A of FIG. 7) formed on the container portion 91 to form an opening portion 99A. In addition, the expansion of the airbag 85 lifts the rear portion of the front cowl 62 in the direction of arrow d at the notch 97 formed on the front cowl 62. Consequently, the airbag 85 is deployed in the directions of arrows e. Since the notched portion (see reference numeral 96 in FIG. 7) is provided on the container portion 91 and the notch 97 is provided on the front cowl 62, the airbag 85 can be smoothly deployed at the desired time.

At this time, along with the deployment of the airbag 85, the bag-mooring members 74L, 74R folded and stored between the partition wall 151 and the rear surface 44e are extended, and the rear surface 44e is moved in the direction of arrow f in FIG. 11 along with the deployment of the airbag 85.

Figure 12:
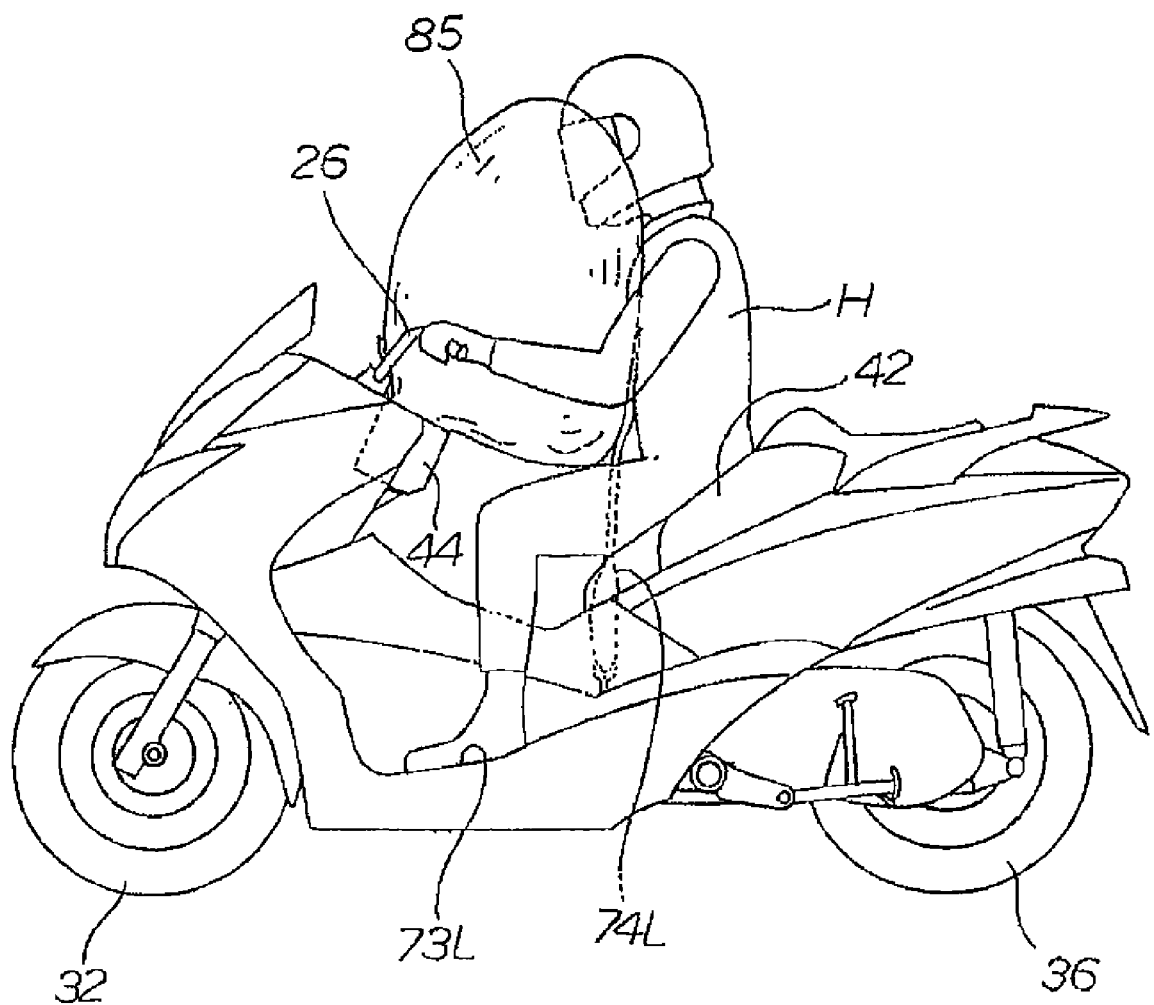
FIG. 12 is an operational explanatory view (at the ending time of deploying the airbag) of the airbag device according to an embodiment of the present invention.

FIG. 12 is an operational explanatory view (at the end of the deployment of the airbag) of the airbag device according to an embodiment of the present invention. The airbag 85 is deployed and hits the front of the occupant H. At this time, along with the deployment of the airbag 85, the bag-mooring members 74L, 74R stored in the cowl 45 comes out of the cowl 45 and retains the airbag 85 at a desired position on the front of the occupant H.

With reference to FIGS. 1 and 2, the airbag module 44 is disposed in an unused space 102 rearward of the head pipe 13 to protrude into the straddle space 43. Therefore, a space can be ensured in the vicinity of the steering handlebar 26. Ensuring the space can make it difficult to affect the layout of members arranged in the vicinity of the steering handlebar 26. Since it is difficult to affect the layout of the members arranged in the vicinity of the steering handlebar 26 in the case of providing the airbag module 44 in the low-floor type vehicle 10, the flexibility of arranging the members in the vicinity of the steering handlebar 26 cam be enhanced.

With reference to FIG. 5, since the airbag control unit 71 is disposed to at least partially overlap the airbag module 44 when the vehicle is viewed from the rearward, the widthwise-length of the airbag device 77 can be suppressed. This can enhance the flexibility of arranging members.

With reference to FIGS. 8 to 12, the pair of left and light bag-mooring members 74L, 74R is disposed along the main frame 14. When the airbag 85 is expanded and deployed, of the bag-mooring members 74L, 74R, the front ends 76L, 76R of the bag-mooring members 74L, 74R which are connecting portions with the air bag 85 are first lifted. Along with the expansion and deployment of the airbag 85, the bag-mooring members 74L, 74R are lifted from the front ends 76L, 76R of the bag-mooring members 74L, 74R toward the rear ends 75L, 75R. As described above, since the bag-mooring members 74L, 74R are disposed along the main frame 14, it is possible for the bag-mooring members 74L, 74R to smoothly guide the airbag 85 in the deploying direction thereof.

The illustrated embodiment describes the scooter-type motorcycle as the low-floor type vehicle; however, the three-wheeled vehicle provided with a low floor portion as a low-floor type vehicle or the like may be applicable.

In addition, the airbag module may be allowed to be disposed rearward of, forward of or upward of the steering handlebar. The rear surface of the airbag module may be allowed to be disposed not to protrude from the external surface of the cowl. The widthwise-length of the airbag module can be set at any length.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low-floor vehicle comprising:
    a head pipe turnably supporting a steering handlebar steerable by an occupant;
    a main frame extending downwardly rearward from the head pipe;
    an occupant seat provided rearward of the head pipe and adapted to allow the occupant to sit thereon;
    a straddle space defined between the occupant seat and the steering handlebar and straddlable by the occupant;
    a cowl covering the main frame and provided below the straddle space;
    a left step floor and a right step floor respectively provided at a left side lower portion and a right side lower portion of the occupant seat;
    an airbag module provided forward of the occupant seat and storing an airbag therein, wherein the airbag module is disposed rearward of the head pipe; and
    a pair of left and right bag-mooring members provided for retaining the airbag at a position facing the occupant upon expansion and deployment of the airbag, wherein the bag-mooring members are arranged along the main frame between the left step floor and the right step floor as view from above and have one ends connected to the airbag and the other ends connected to the main frame at a position below the occupant seat, wherein the bar-mooring members are arranged along above the main frame and are arranged along a space defined between the main frame and the cowl, and wherein the cowl is formed in an inner surface with a fragile portion along the bag-mooring members; and
    wherein the main frame includes a pair of left and right upper frames extending downwardly rearward from an upper portion of the head pipe, a pair of left and right lower frames extending downwardly rearward from a lower portion of the head pipe, and connecting members, each of the connecting member being vertically spanned between one of the upper frames and a corresponding one of the lower frames, wherein the other end of each of the bag-mooring members is connected to a corresponding one of the connecting members.

2. The low-floor vehicle according to claim 1, wherein a partition wall is provided between a rear surface of the airbag module and the airbag, and the bag-mooring members are partially folded and stored between the partition wall and the rear surface of the airbag module.

3. The low-floor vehicle according to claim 1, wherein the airbag module partially overlaps the head pipe in a vertical direction.

4. The low-floor vehicle according to claim 1, wherein a central axis of the airbag module is parallel to an axis of the head pipe.

5. The low-floor vehicle according to claim 1, wherein the main frame includes a pair of left and right upper frames extending downwardly rearward from an upper portion of the head pipe, and a pair of left and right lower frames extending downwardly rearward from a lower portion of the head pipe, the other end of the left bag-mooring member is located between the left upper frame and the left lower frame as seen from a left side view of the low-floor vehicle, and the other end of the right bag-mooring member is located between the right upper frame and the right lower frame as seen from a right side view of the low-floor vehicle.

6. The low-floor vehicle according to claim 5, wherein the main frame further includes a pair of connecting members, each of the connecting members extending downwardly from a corresponding one of the left and right upper frames to a corresponding one of the left and right lower frames and ending at the corresponding one of the left and right lower frames, the other end of each of the left and right bag-mooring members being directly fixed to and in contact with a corresponding one of the connecting members.

7. The low-floor vehicle according to claim 6, wherein the entire connecting members are located in front of a rear end of each of the left and right upper frames and a rear end of each of the left and right lower frames.

8. A scooter comprising:
    a head pipe turnably supporting a steering handlebar;
    a main frame extending downwardly rearward from the head pipe;
    an occupant seat located behind the head pipe;
    an airbag module located in front of the occupant seat and behind the head pipe, the airbag module storing an airbag therein; and
    a pair of bag-mooring members configured to retain the airbag at a position facing the occupant upon expansion and deployment of the airbag, wherein the bag-mooring members are arranged along the main frame and have one ends connected to the airbag and the other ends connected to the main frame at a position below the occupant seat,
    wherein the main frame includes a pair of left and right upper frames extending downwardly rearward from an upper portion of the head pipe, and a pair of left and right lower frames extending downwardly rearward from a lower portion of the head pipe, the other end of the left bag-mooring member is located between the left upper frame and the left lower frame as seen from a left side view of the scooter, and the other end of the right bag-mooring member is located between the right upper frame and the right lower frame as seen from a right side view of the scooter.

9. The scooter of claim 8, wherein a straddle space straddlable by the occupant is located between the occupant seat and the steering handlebar, and a rear surface of the airbag module faces the straddle space.

10. The scooter according to claim 8, wherein the main frame is covered by a cowl, and the bag-mooring members are arranged along a space defined between the main frame and the cowl.

11. The scooter according to claim 8, wherein the cowl is formed in an inner surface with a fragile portion along the bag-mooring members.

12. The scooter according to claim 8, wherein the main frame further includes a pair of connecting members, each of the connecting members extending downwardly from a corresponding one of the left and right upper frames to a corresponding one of the left and right lower frames and ending at the corresponding one of the left and right lower frames, the other end of each of the left and right bag-mooring members being directly fixed to and in contact with a corresponding one of the connecting members.

13. The scooter according to claim 8, wherein a partition wall is provided between a rear surface of the airbag module and the airbag, and the bag-mooring members are partially folded and stored between the partition wall and the rear surface of the airbag module.

14. The scooter according to claim 8, wherein the airbag module partially overlaps the head pipe in a vertical direction.

15. The scooter according to claim 8, wherein a central axis of the airbag module is parallel to an axis of the head pipe.

16. The scooter according to claim 12, wherein the entire connecting members are located in front of a rear end of each of the left and right upper frames and a rear end of each of the left and right lower frames.

* * * * *